(12) United States Patent
Shen et al.

(10) Patent No.: US 8,731,400 B2
(45) Date of Patent: May 20, 2014

(54) CHARACTERIZING A FREQUENCY CHANNEL IN AN OPTICAL NETWORK

(75) Inventors: Jinxi Shen, San Ramon, CA (US); David R. Walker, Ottawa (CA); Leonid Frenkel, Palo Alto, CA (US); Yu Zhang, Kanata (CA); Barthelemy Fondeur, San Jose, CA (US); Vlatko Milinkovic, Ottawa (CA); Yimin Hua, Los Altos, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 150 days.

(21) Appl. No.: 13/442,672

(22) Filed: Apr. 9, 2012

(65) Prior Publication Data

US 2013/0266313 A1    Oct. 10, 2013

(51) Int. Cl.
*H04B 10/08*  (2006.01)
*H04J 14/00*  (2006.01)

(52) U.S. Cl.
USPC ............................................. 398/34; 398/69

(58) Field of Classification Search
CPC .. H04B 10/0775; H04B 10/03; H04B 10/032; H04B 10/035; H04B 10/038; H04B 10/07955; H04B 10/077; H04J 14/0221
USPC ...................................................... 398/34, 69
See application file for complete search history.

(56) References Cited

U.S. PATENT DOCUMENTS

| | | | | |
|---|---|---|---|---|
| 5,519,526 A * | 5/1996 | Chua et al. | ............ | 398/139 |
| 5,712,716 A * | 1/1998 | Vanoli et al. | ............ | 398/34 |
| 6,118,530 A * | 9/2000 | Bouevitch et al. | ............ | 356/308 |
| 6,396,051 B1 * | 5/2002 | Li et al. | ............ | 250/227.18 |
| 6,504,709 B2 * | 1/2003 | Yang et al. | ............ | 361/679.4 |
| 6,975,395 B1 * | 12/2005 | Gentieu et al. | ............ | 356/326 |
| 7,002,697 B2 * | 2/2006 | Domash et al. | ............ | 356/519 |
| 7,783,197 B2 * | 8/2010 | Litvin et al. | ............ | 398/81 |
| 7,940,794 B2 * | 5/2011 | Zhang et al. | ............ | 370/468 |
| 8,213,797 B2 * | 7/2012 | Mostert et al. | ............ | 398/69 |
| 8,457,316 B2 * | 6/2013 | Brodsky et al. | ............ | 380/278 |
| 2003/0048498 A1 * | 3/2003 | Pearson et al. | ............ | 359/110 |
| 2003/0128917 A1 * | 7/2003 | Turpin et al. | ............ | 385/24 |
| 2004/0179842 A1 * | 9/2004 | Futami et al. | ............ | 398/75 |
| 2005/0078957 A1 * | 4/2005 | Hendow | ............ | 398/33 |
| 2005/0286908 A1 * | 12/2005 | Way | ............ | 398/186 |
| 2009/0263142 A1 * | 10/2009 | Shen et al. | ............ | 398/158 |
| 2013/0089324 A1 * | 4/2013 | Eiselt | ............ | 398/34 |
| 2013/0129341 A1 * | 5/2013 | D'Errico et al. | ............ | 398/5 |

* cited by examiner

*Primary Examiner* — Ken Vanderpuye
*Assistant Examiner* — Abbas H Alagheband
(74) *Attorney, Agent, or Firm* — Matthew A. Pequignot; Pequignot + Myers

(57) ABSTRACT

A tunable optical filter is configured to take point measurements at a few optical frequencies per frequency channel of a DWDM optical network. The measurement frequencies are shifted by pre-determined amounts relative to the optical frequency channel being characterized. Since the spectral shape of the tunable optical filter is known, the center optical frequency, the modulation bandwidth, and the total optical power of the channel can be obtained from as few as three optical measurements. The center optical frequency and the total optical power can be continuously monitored by providing a tunable filter stage coupled to an interleaver stage, and computing a ratio and a weighted sum the optical signals at the two outputs of the interleaver stage.

21 Claims, 14 Drawing Sheets

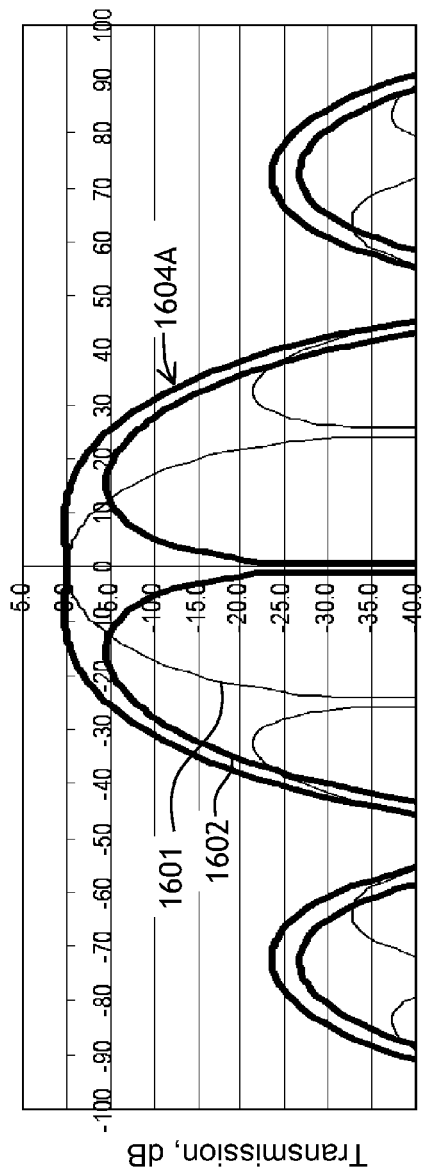
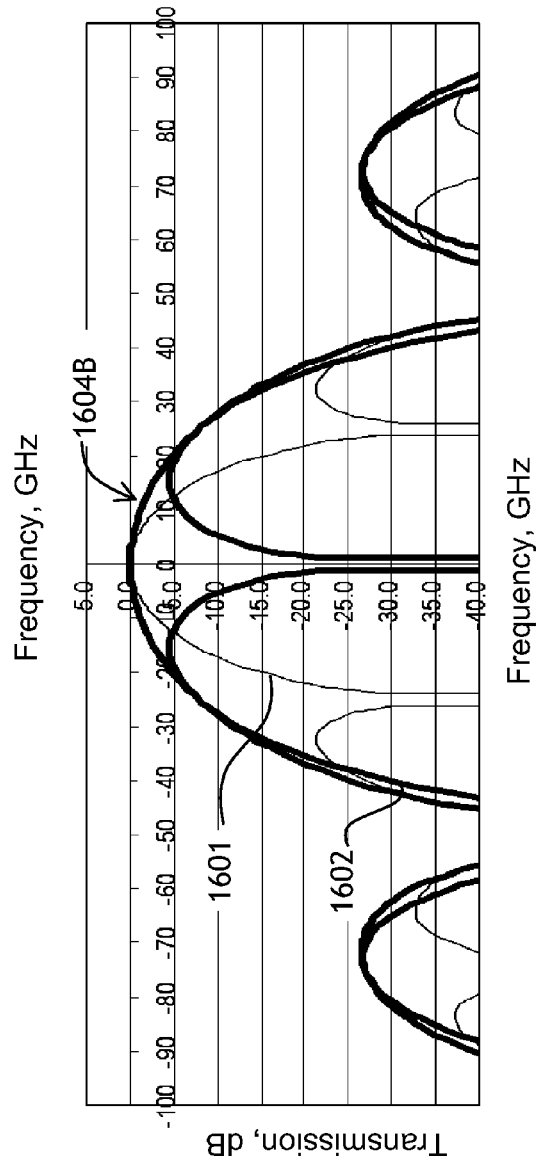
FIG. 16A
FIG. 16B

CHARACTERIZING A FREQUENCY CHANNEL IN AN OPTICAL NETWORK

TECHNICAL FIELD

The present invention relates to devices and methods for monitoring performance of an optical network, and in particular to devices and methods for measuring optical parameters of frequency channels in an optical network.

BACKGROUND OF THE INVENTION

In an optical communications network, an optical signal is modulated with digital information and transmitted from a source location to a destination location. Many individually modulated "optical frequency channels" at different optical frequencies can be combined for transmission in a single optical fiber, whereby the transmission capacity of the optical fiber increases many times. The modulated optical frequency channels can be simultaneously amplified by a single optical amplifier. A chain of optical amplifiers, connected to each other with spans of optical fiber, allows for massive data transmission over very long distances. The digital data encoded in each of the optical frequency channels can be transmitted over hundreds and even thousands of kilometers.

When a transmitter at a particular optical frequency fails, the optical frequency channel "disappears", leading to a disruption of transmission of digital information encoded in that channel. When the transmitter's optical frequency shifts, reception of neighboring channels may be affected. When an optical modulator of a particular optical frequency channel fails, the modulation is lost, and no digital information is transmitted to a destination. To be able to detect these impairments, center optical frequency, modulation bandwidth, and optical power of each and every frequency channel need to be closely monitored.

One type of optical channel monitors of the prior art is based on optical filters having a narrow transmission band, that can be scanned across the spectrum of an optical signal in the network. Center frequency (or wavelength) of the transmission band of the filter is continuously scanned, while the optical signal at the output of the filter is measured at the same time. Optical frequency channels appear as peaks on the resulting scanned spectrum of the optical signal. By measuring position, width, and height of the peaks, the center optical frequency, the modulation bandwidth, and the optical power of each optical frequency channel can be determined. Disadvantageously, scanning optical channel monitors tend to have a slow time response, in particular when optical performance of one optical frequency channel needs to be evaluated or monitored in real time. This occurs because the whole spectrum needs to be scanned to obtain current information on the optical frequency channel of interest.

Parallel detection of light at different optical frequencies can be used to overcome the slow response drawback. Referring to FIG. 1, a prior-art detector-array optical channel monitor 100 includes an input port 102, an input collimator 104, a diffraction grating 106, an output collimator 108, and a detector array 110 connected to a controller 112. An input optical signal 101 coupled to the input port 102 is collimated by the input collimator 104, dispersed into individual optical frequency channels 105 by the diffraction grating 106, and is focused by the output collimator 108 onto the detector array 110. All optical frequency channels 105 are thus detected simultaneously. The controller 112 processes data to obtain the channel information such as power, wavelength, and spectral width.

Modern photodetector arrays capable of detecting light in the optical telecommunication wavelength region, typically at wavelengths of about 1.54 microns, can provide up to 4-5 pixels per optical frequency channel. Unfortunately, this is often not enough to perform reliable and unambiguous spectral measurements. Due to non-linearity of angular dispersion of the diffraction grating 106, position of individual pixels of the detector array 110 is usually not correlated with respect to individual optical frequency channels 105. This could be overcome by constructing a detector array with a custom, varying pixel pitch, but custom designs of pixel arrays can be prohibitively expensive.

SUMMARY OF THE INVENTION

It is a goal of the present invention to alleviate drawbacks of slow response time, low accuracy, and/or high cost of prior-art optical channel monitors.

The present invention uses a tunable optical filter configured to take point measurements at a few optical frequencies per channel. The measurement frequencies can be shifted by pre-determined amounts relative to the optical frequency channel being characterized. In one embodiment, as little as three optical measurements are performed for each optical frequency channel of interest, at optical frequencies smaller than, equal to, and larger than the optical frequency of the channel. Since the spectral shape of the tunable optical filter is known, the center optical frequency, the modulation bandwidth, and the total optical power of the channel can be obtained from these three well-placed optical measurements by employing a simple analytical computation.

In one embodiment of the invention, the center optical frequency or the total optical power are continuously monitored. In this embodiment, the tunable optical filter includes two serially connected stages, a tunable filter stage and an optical interleaver stage having two interleaver outputs. By tuning the tunable filter stage to the center frequency of the optical channel, while off-tuning the optical interleaver slightly off center frequency, the center frequency can be continuously monitored by tracking a ratio of optical signals at the output of the interleaver stage. By tuning both the tunable filter stage and the interleaver stage to the center frequency of the optical channel and tracking a weighted sum of the optical signals at the output of the interleaver stage, the total optical power of the optical frequency channel can be continuously monitored.

A preferable embodiment of the tunable filter used on the invention includes a plurality of sequentially coupled Mach-Zehnder interferometers, which are tunable so as to have one passband of each Mach-Zehnder interferometer centered on the center frequency of the tunable optical filter, and to have at least one of the stopbands of the Mach-Zehnder interferometers centered on ITU frequencies of the frequency channels other than the selected frequency channel. Conveniently, the Mach-Zehnder interferometers can be implemented in a planar lightwave circuit (PLC).

In accordance with the invention, there is provided a method for characterizing a selected one of a plurality of frequency channels of an optical signal in an optical network, the method comprising:
(a) providing a tunable optical filter having an input port for inputting the optical signal, and a first output port for outputting a filtered optical signal, wherein a spectral bandwidth of the tunable optical filter $\sigma_{TF}$ is smaller than one half of a channel spacing $\Delta f$ of the optical network, and coupling the optical signal to the input port;

(b) upon completion of step (a), tuning a center frequency of the tunable optical filter to first, second, and third measurement frequencies proximate a center frequency $F_S$ of the selected frequency channel, and measuring first, second, and third optical signals $P_1$, $P_2$, and $P_3$ at the first output port at the first, second, and third measurement frequencies, respectively, wherein the first, second, and third optical signals $P_1$, $P_2$, and $P_3$ originate from the selected frequency channel;
(c) upon completion of step (b), determining the center frequency $F_S$ of the selected frequency channel from the first, second, and third optical signals $P_1$, $P_2$, and $P_3$ measured in step (b), and determining first and second frequency offsets $f_1$ and $f_2$ between the first and second measurement frequencies, respectively, and the center frequency $F_S$; and
(d) upon completion of step (c), determining a total optical power $P_S$ and a spectral width $\sigma_S$ of the selected frequency channel from the first and second optical signals $P_1(f_1)$ and $P_2(f_2)$.

In accordance with another aspect of the invention, there is further provided a method for characterizing a selected one of a plurality of frequency channels of an optical signal in an optical network, the method comprising:
(a) providing a tunable optical filter having an input port for inputting the optical signal, and first and second output ports for outputting filtered optical signals, wherein the tunable optical filter comprises a tunable filter stage and an optical interleaver stage serially coupled to each other, wherein the tunable filter stage is coupled to the input port, and wherein the optical interleaver stage has first and second optical branches coupled to the first and second output ports, respectively, wherein a spectral bandwidth of the tunable optical filter between the input port and the first output port; and between the input port and the second output port is smaller than one half of a channel spacing $\Delta f$ of the frequency channels of the optical network;
(b) tuning a center frequency of the tunable filter stage to an ITU frequency $f_{ITU}$ of the selected frequency channel;
(c) tuning a peak transmission frequency of the first optical branch of the optical interleaver stage to the ITU frequency $f_{ITU}$;
(d) upon completion of steps (b) and (c), measuring first and second optical signals at the first and second output ports, respectively; and
(e) upon completion of step (d), determining an optical power of the selected frequency channel from a weighted sum and of the first and second optical signals measured in step (d).

In one embodiment, the method further comprises
(f) tuning the center frequency of the tunable filter stage to the ITU frequency $f_{ITU}$;
(g) tuning the peak transmission frequency of the first optical branch of the optical interleaver stage to $f_0 = f_{ITU} - \Delta f/2$;
(h) upon completion of steps (f) and (g), measuring third and fourth optical signals at the first and second output ports, respectively; and
(i) upon completion of step (h), determining a center frequency of the selected frequency channel from a ratio and of the third and fourth optical signals measured in step (h).

In accordance with the invention, there is provided an apparatus for characterizing a selected one of a plurality of frequency channels of an optical signal in an optical network, the apparatus comprising:
a tunable optical filter having an input port for inputting the optical signal, and a first output port for outputting a filtered optical signal, wherein a spectral bandwidth of the tunable optical filter $\sigma_{TF}$ is smaller than one half of a channel spacing $\Delta f$ of the optical network;

a controller coupled to the tunable optical filter for tuning a central frequency thereof, and to the first output port for detecting light exiting therefrom;
wherein the controller is configured to tune a center frequency of the tunable optical filter to first, second, and third measurement frequencies proximate a center frequency $F_S$ of the selected frequency channel, and to measure first, second, and third optical signals $P_1$, $P_2$, and $P_3$ at the first output port at the first, second, and third measurement frequencies, respectively, wherein the first, second, and third optical signals $P_1$, $P_2$, and $P_3$ originate from the selected frequency channel; and
wherein the controller is further configured to determine the center frequency $F_S$ of the selected frequency channel from the measured first, second, and third optical signals $P_1$, $P_2$, and $P_3$, and determine first and second frequency offsets $f_1$ and $f_2$ between the first and second measurement frequencies, respectively, and the center frequency $F_S$; and to determine a total optical power $P_S$ and a spectral width $\sigma_S$ of the selected frequency channel from the first and second optical signals $P_1(f_1)$ and $P_2(f_2)$.

Preferably, the total optical power $P_S$ and the spectral width $\sigma_S$ of the selected frequency channel are determined using the following equations:

$$P_S = \frac{\sigma_{OCM} P_1}{\sigma_{TF}} \cdot \exp\left[\frac{f_1^2}{2\sigma_{OCM}^2}\right]; \text{ and } \sigma_s = \sqrt{\sigma_{OCM}^2 - \sigma_{TF}^2};$$

$$\text{wherein } \sigma_{OCM} = \sqrt{\frac{f_2^2 - f_1^2}{2\ln\left(\frac{P_1}{P_2}\right)}}.$$

In one embodiment, the tunable optical filter comprises a plurality of sequentially coupled Mach-Zehnder interferometers. Also in one embodiment, the tunable optical filter comprises a tunable filter stage and an optical interleaver stage serially coupled to each other, and a second output port, wherein the tunable filter stage is coupled to the input port, and wherein the optical interleaver stage has first and second optical branches coupled to the first and second output ports, respectively. The controller is coupled to the second output port for detecting light exiting the second output port.

The tunable filter stage of the tunable optical filter can include a plurality of sequentially coupled Mach-Zehnder interferometers each having a plurality of equidistantly spaced conterminous frequency passbands and frequency stopbands, tunable by the controller. In this embodiment, the Mach-Zehnder interferometers are tunable so as to have one passband of each Mach-Zehnder interferometer centered on the central frequency of the tunable optical filter, and to have at least one of the stopbands of the Mach-Zehnder interferometers centered on an ITU frequency of each of the plurality of frequency channels, other than the selected frequency channel, for rejection of the remaining channels. Preferably, the Mach-Zehnder interferometers of the tunable filter stage and the optical interleaver stage are implemented in form of a planar lightwave circuit.

BRIEF DESCRIPTION OF THE DRAWINGS

Exemplary embodiments will now be described in conjunction with the drawings in which.

FIGS. 16A, 16B are spectral plots at two interleaver outputs of the interleaver stage of FIG. 6, showing a weighted (FIG. 16A) and unweighted (FIG. 16B) sum of the two interleaved output signals;

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
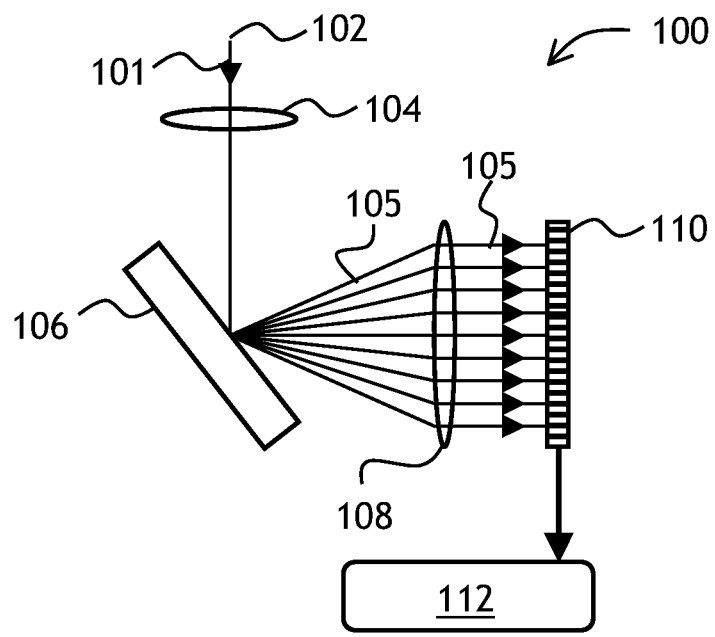
FIG. 1 is a block diagram of a prior-art optical channel monitor.
Figure 2:
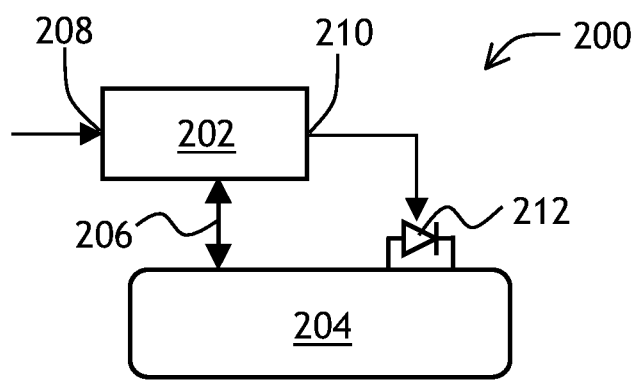
FIG. 2 is a block diagram of an apparatus of the invention for characterizing a frequency channel of an optical network.

Referring to FIG. 2, an apparatus 200 for characterizing frequency channels in an optical network includes an optical filter 202 tunable by a controller 204 through a link 206. The tunable optical filter 202 has an input port 208 for inputting an optical signal to be measured, and an output port 210 for outputting a filtered optical signal. The filter 202 has enough spectral selectivity to allow measurements of individual frequency channels. At least, a spectral bandwidth of the tunable optical filter $\sigma_{TF}$ is smaller than one half of a channel spacing $\Delta f$ of the optical network. The controller 204 has a photodiode 212 optically coupled to the output port 210 of the tunable filter 202, for detecting light exiting the output port 210. The controller is programmed to perform spectral measurements of individual frequency channels of an optical network.

Figure 3:
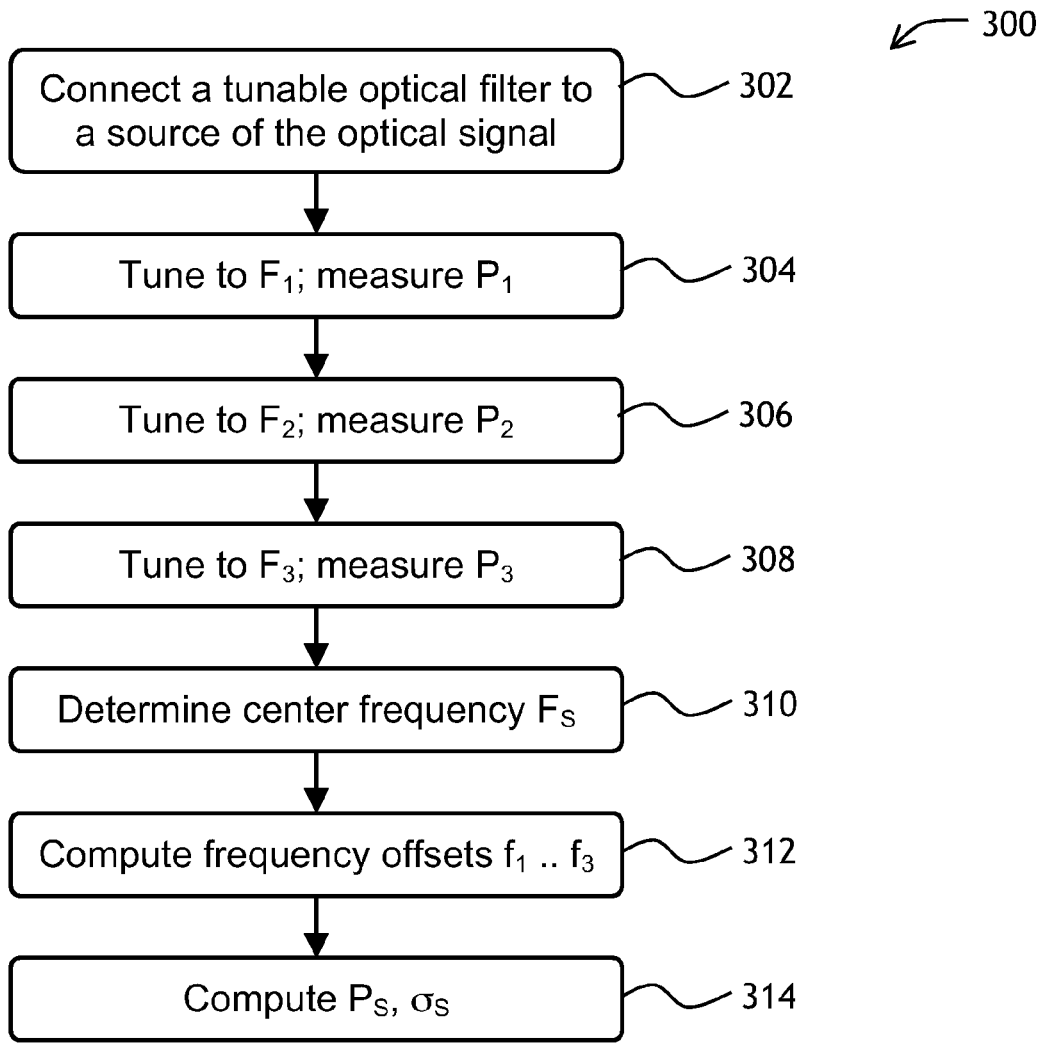
FIG. 3 is a flow chart of a method of characterizing a frequency channel using the apparatus of FIG. 2.

The operation of the apparatus 200 is illustrated in FIG. 3 showing a method 300 of characterizing a single ("selected") optical frequency channel using the apparatus 200. In a step 302, the input port 208 of the tunable filter 202 is connected to a source of the optical signal carrying the selected frequency channel. Then, in steps 304, 306, and 308, the controller 204 tunes a center frequency of the tunable optical filter 202 to first, second, and third measurement frequencies $F_1$, $F_2$, and $F_3$ proximate a center frequency $F_S$ of the selected frequency channel, and performs a measurement of first, second, and third optical signals $P_1$, $P_2$, and $P_3$ at the first output port 210 at the first, second, and third measurement frequencies $F_1$, $F_2$, and $F_3$, respectively. The measurement frequencies $F_1$, $F_2$, and $F_3$ are close enough to the center frequency $F_S$ of the selected frequency channel, so that the first, second, and third optical signals $P_1$, $P_2$, and $P_3$ originate from the selected frequency channel. Then, in a step 310, the center frequency $F_S$ of the selected frequency channel is determined from the first, second, and third optical signals $P_1$, $P_2$, and $P_3$ measured in steps 304, 306, and 308, respectively. The details of methods to determine the center frequency $F_S$ will be given further below. The steps 304, 306, and 308 of measuring the first, second, and third optical signals $P_1$, $P_2$, and $P_3$ need not be performed in the order shown.

Once the center frequency $F_S$ is known, in a step 312, frequency offsets $f_1$, $f_2$, and $f_3$ are determined as a difference between the first, second, and third measurement frequencies $F_1$, $F_2$, and $F_3$, respectively, and the center frequency $F_S$. The frequency offsets $f_1$, $f_2$, and $f_3$ will be used in the subsequent computations of a total optical power $P_S$ and a spectral width $\sigma_S$ of the selected frequency channel, which take place in a step 314. When a functional dependence describing the spectral shape of the selected frequency channel can be defined by only two parameters, such as the total optical power $P_S$ and the spectral width $\sigma_S$, only two of the three measured optical signals $P_1$, $P_2$, and $P_3$ at two $f_1$, $f_2$ of the three frequency offsets $f_1$, $f_2$, and $f_3$ are required to determine the total optical power $P_S$ and the spectral width $\sigma_S$ of the selected frequency channel. Of course, using all three measured optical signals $P_1$, $P_2$, and $P_3$ will increase the measurement precision of the total optical power $P_S$ and the spectral width $\sigma_S$.

Since the optical frequency channels are created by using a known method of optical signal modulation, their spectral shape is generally known. For example, it is generally known that a typical spectral shape of a frequency channel can be approximated by a Gaussian function:

$$f_S = \frac{P_S}{\sqrt{2\pi}\,\sigma_S} \exp\left(-\frac{f^2}{2\sigma_S^2}\right) \quad (1)$$

wherein $f$ is a frequency offset from the center frequency of the Gaussian shape $f_S$.

In the following calculation, it is assumed that the spectral shape of the tunable filter 202 is also described by a Gaussian function $f_{TF}$ $$f_{TF} = \exp\left(-\frac{f^2}{2\sigma_{TF}^2}\right) \quad (2)$$

wherein $\sigma_{TF}$ is a spectral width of the Gaussian shape $f_{TF}$.

A measured optical signal $P_0$ detuned from the center frequency of the selected frequency channel by a frequency offset $f_0$ is described by a convolution integral $$P_0 = \int_{-\infty}^{+\infty} f_{TF}(f - f_0) \cdot f_S(f)\,df \quad (3)$$

By substituting $f_{TF}$ and $f_S$ in (3) with their analytical expressions from (1) and (2), one obtains $$P_O = \frac{\sigma_{TF} P_S}{\sigma_{OCM}} \cdot \exp\left[-\frac{f_O^2}{2\sigma_{OCM}^2}\right] \quad (4)$$

wherein $$\sigma_{OCM} = \sqrt{\sigma_S^2 + \sigma_{TF}^2} \quad (5)$$

Resolving (4) and (5) about $P_S$ and $\sigma_S$, one obtains $$P_S = \frac{\sigma_{OCM} P_1}{\sigma_{TF}} \cdot \exp\left[\frac{f_1^2}{2\sigma_{OCM}^2}\right]; \text{ and} \quad (6)$$

$$\sigma_{OCM} = \sqrt{\frac{f_2^2 - f_1^2}{2\ln\left(\frac{P_1}{P_2}\right)}} \quad (7)$$

Therefore, when the spectral shapes of the tunable filter 202 and the frequency channels are Gaussian, the total optical power $P_S$ and the spectral width $\sigma_S$ of the selected frequency channel can be determined from the first and second measured optical signals $P_1(f_1)$ and $P_2(f_2)$ using the equations (6) and (7). Of course, $P_3(f_3)$ can also be used in place of either $P_1(f_1)$ and $P_2(f_2)$ in the equations (6) and (7), to increase the fidelity and/or accuracy of determination of the total optical power $P_S$ and the spectral width $\sigma_S$.

Figure 4A:
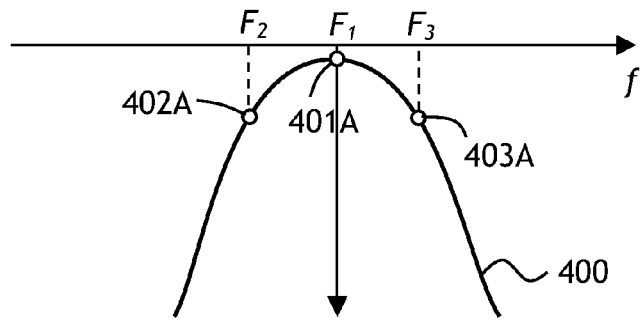
FIG. 4A is a spectral plot of a frequency channel showing three measurement points disposed symmetrically with respect to a center of the frequency channel being characterized.

Ideally, the first measurement frequency $F_1$ is positioned exactly on the center frequency $F_S$ of the selected frequency channel, and the second and third measurement frequencies $F_2$ and $F_3$ are disposed equidistantly from the first measurement frequency $F_1$, on both sides of the first measurement frequency $F_1$. This "ideal" situation is shown in FIG. 4A, in which first, second, and third measurement points 401A, 402A, and 403A are disposed on a spectral shape 400 of the selected frequency channel so that the first frequency offset $f_1=0$, and the second and third frequency offsets $f_2=-f_3\ne 0$. This position is advantageous because it results in a high accuracy of determination of the center frequency $F_S$ and the spectral width $\sigma_S$ of the selected frequency channel.

One might attempt to arrive at the measurement situation depicted in FIG. 4A by tuning the first measurement frequency $F_1$ to an ITU grid frequency of the selected frequency channel. However, in real life situations, individual frequency channels are often slightly detuned from the ITU grid frequencies. In fact, the determination of the magnitude of the detuning for each frequency channel is one of the key goals of optical channel monitoring.

Figure 4B:
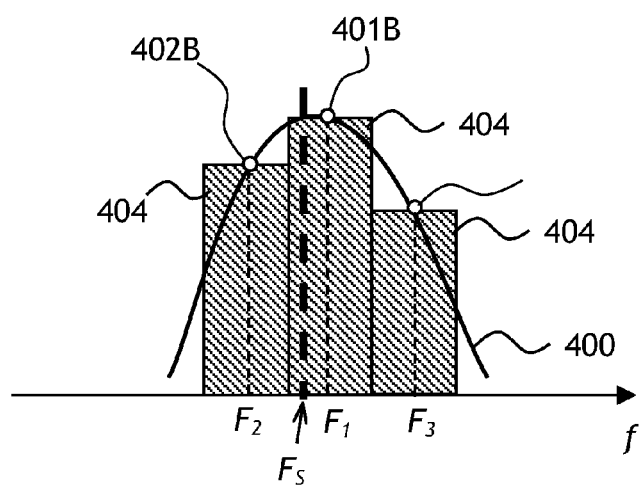
FIG. 4B is a spectral plot of a frequency channel showing three measurement points disposed asymmetrically with respect to the channel, showing a center frequency of the channel computed from a mean average of the three optical frequencies weighted by the optical power readings at these frequencies.

Referring to FIG. 4B with further reference to FIG. 3, measurement points 401B, 402B, and 403B are asymmetric with regards to the center frequency $F_S$. To determine the total optical power $P_S$ and the spectral width $\sigma_S$ of the selected frequency channel using the formulas (6) and (7) above, the frequency offsets $f_1$, $f_2$, and $f_3$ need to be known first, which accordingly requires the knowledge of the center frequency $F_S$. This is why the step 310 in the method 300 is performed. To determine the center frequency $F_S$, one can compute an average of the first, second, and third measurement frequencies $F_1$, $F_2$, and $F_3$, weighted by the measured optical signals $P_1$, $P_2$, and $P_3$, respectively:

$$F_S = \frac{F_1 P_1 + F_2 P_2 + F_3 P_3}{P_1 + P_2 + P_3} \quad (8)$$

That is, the center frequency $F_S$ of the selected frequency channel can be found by projecting the "center of mass" of a shape formed by three shaded rectangles 404 in FIG. 4B onto the frequency axis.

Alternatively or in addition, the center frequency $F_S$ of the selected frequency channel can be calculated by curve-fitting of the measured optical signals $P_1$, $P_2$, and $P_3$ to a Gaussian function.

Figure 4C:
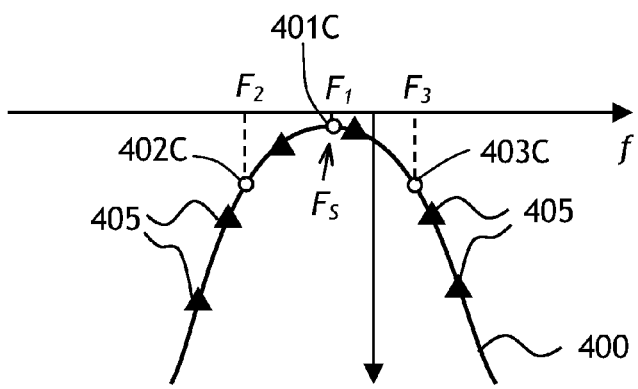
FIG. 4C is a spectral plot of a frequency channel showing three measurement points disposed asymmetrically with respect to the channel, indicating a center frequency of the channel computed from a Gaussian fit of the measurement points.

Yet another method of performing the step 310 of determining the center frequency $F_S$ of the selected frequency channel includes scanning of the selected frequency channel with the tunable filter 202, followed by a curve-fitting. Referring to FIG. 4C, the channel spectral shape 400 is scanned by taking multiple points 405 during scanning. Any suitable curve-fitting method can be employed, to a Gaussian, Lorentzian, or any other suitable model spectral shape. Once the center frequency $F_S$ of the selected frequency channel is determined, the measurement of the optical signals $P_1$, $P_2$, and $P_3$ is performed at points 401C, 402C, and 403C.

Figure 5:
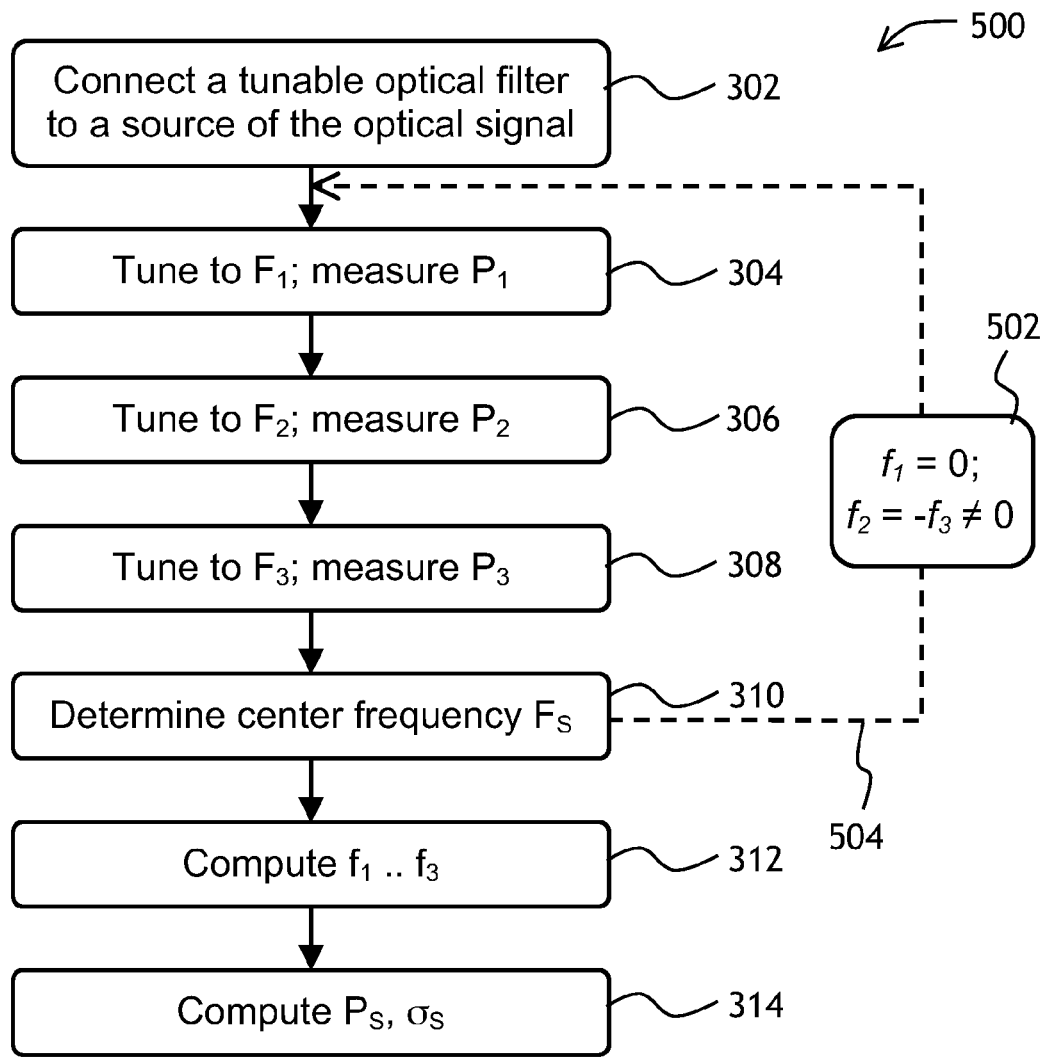
FIG. 5 is a flow chart of a method for characterizing a frequency channel using the apparatus of FIG. 2, involving an iterative determination of the channel center frequency according to methods illustrated in FIGS. 4B and 4C.

To improve accuracy and fidelity of frequency channel characterization, the optical channel measurements can be done iteratively. Once the center frequency $F_S$ is known, the measurement can be repeated at the measurement points 401A, 402A, and 403A disposed symmetrically with respect to the center frequency $F_S$ of the selected frequency channel 400 of FIG. 4A. Referring to FIG. 5, a method 500 of characterizing a frequency channel is similar to the method 300 of FIG. 3, the difference being that, upon completion of the step 310 of determining the center frequency $F_S$, the measurement steps 304, 306, and 308 of measuring the optical signals $P_1$, $P_2$, and $P_3$ are repeated (as indicated by a dashed line 504) at different measurement frequencies, so that the measurement points are disposed symmetrically with respect to the selected frequency channel. For the repeated measurement, $f_1=0$, and $f_2=-f_3\ne 0$, as denoted at 502. For the repeated measurement, the measurement frequencies are disposed as depicted in FIG. 4A. The number of iterations can be increased to achieve a desired measurement precision. Typically, two or three iterations may be required.

Figure 6:
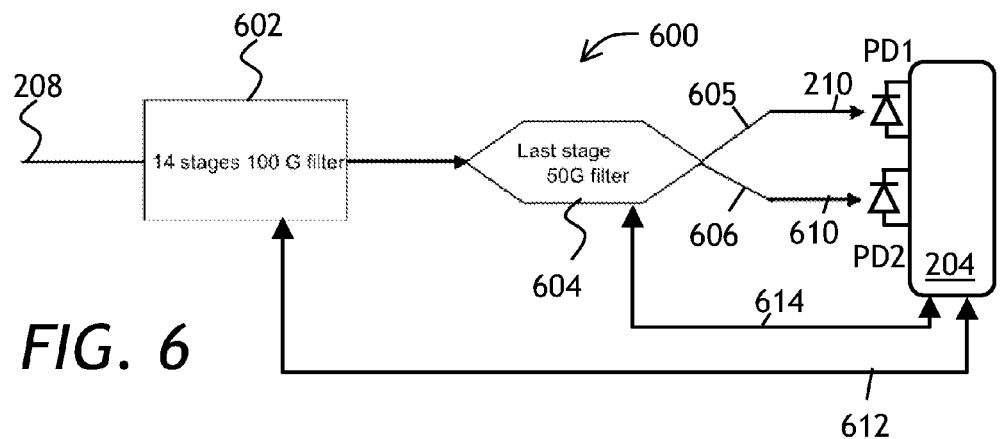
FIG. 6 is a block diagram of an embodiment of the apparatus of FIG. 2, wherein the tunable filter includes a tunable filter stage serially coupled to an optical interleaver stage.

Referring now to FIG. 6 with further reference to FIG. 2, an embodiment 600 of the apparatus 200 includes a tunable filter stage 602 and an optical interleaver stage 604 serially coupled to each other, and a second output port 610 in addition to the first output port 210. The tunable filter stage 602 is coupled to the input port 208, and the optical interleaver stage 604 has first and second optical branches 605 and 606 coupled to the first and second output ports 210 and 610, respectively. Light exiting the first and second output ports 210 and 610 is detected by the controller 204 using a pair of photodiodes PD1 and PD2, respectively.

In the embodiment shown, the tunable filter stage includes a cascade of fourteen Mach-Zehnder interferometers, not shown in FIG. 6, with the smallest free spectral range of 100 GHz. The optical interleaver stage 604 has a frequency spacing of 50 GHz, that is, one half of the smallest free spectral range of the Mach-Zehnder interferometers. Other frequency spacing values can be used, depending on the frequency spacing in the optical network being monitored. The spectral bandwidth of the tunable optical filter, including the filter stage 602 and the interleaver stage 604, between the input port 208 and the first output port 210; and between the input port 208 and the second output port 610 should be smaller than one half of the channel spacing $\Delta f$ of the frequency channels of the optical network.

The tunable filter stage 602 and the optical interleaver stage 604 are individually and independently tunable by the controller 204 using control lines 612 and 614, respectively. The independent tenability of the tunable filter stage 602 and the optical interleaver stage 604 enables the following capabilities of the apparatus 600.

Figure 7:
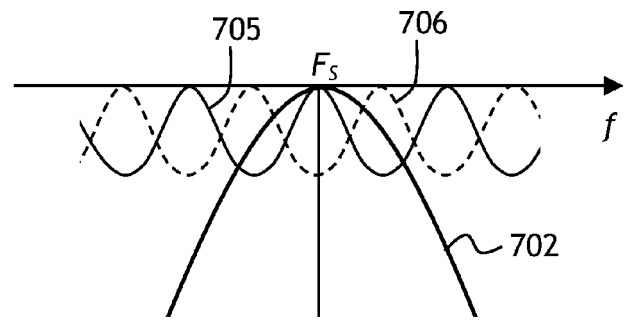
FIGS. 7 and 8 are spectral plots showing transmission spectra of the filter stage and the optical interleaver stage of the tunable optical filter of FIG. 6, tuned to measure or monitor the channel optical power (FIG. 7) and center frequency (FIG. 8)

One is a capability to measure or continuously monitor a current optical power $P_C$ in a selected frequency channel. Referring to FIG. 7 with further reference to FIG. 6, the center frequency of a transmission spectrum 702 of the tunable filter stage 602 and a peak frequency of a transmission spectrum 705 of the first optical branch 605 of the optical interleaver stage 604 are tuned to the ITU frequency $F_{ITU}$ of a frequency channel being monitored. A transmission spectrum 706 of the second optical branch 606 of the optical interleaver stage 604 is shown in dashed line. Optical signals $P_4$ and $P_5$ at the first and second output ports 210 and 610 of the first and second optical branches 605 and 606, respectively, are monitored simultaneously. The current optical power $P_C$ of the selected frequency channel can be determined from a weighted sum of the monitored fourth and fifth optical signals $P_4$ and $P_5$:

$$P_C = aP_4 + bP_5 \qquad (9)$$

wherein a and b are predetermined coefficients. Using the weighted sum of Equation (9) allows "broadband" measurement of the optical power, that is, a measurement of the total optical power present in the frequency channel. Such a measurement is much less dependent on the spectral width $\sigma_S$ of the selected frequency channel than a measurement based entirely on $P_4$, that is, a measurement where b=0. In cases where center frequency $F_S$ of the selected frequency channel is known from a previous measurement, the center frequency of the transmission spectrum 702 of the tunable filter stage 602 and the peak frequency of the transmission spectrum 705 of the first optical branch 605 of the optical interleaver stage 604 can be tuned to the center frequency $F_S$ instead of $F_{ITU}$.

Figure 8:
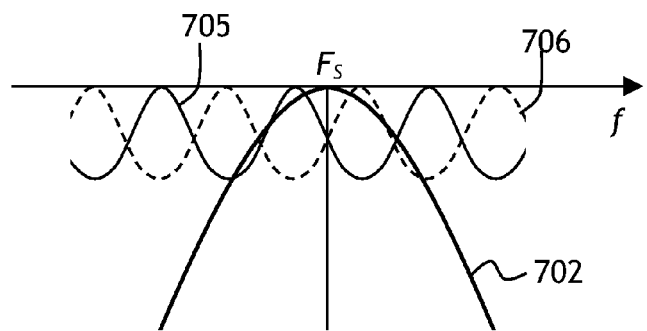
Figure 9:
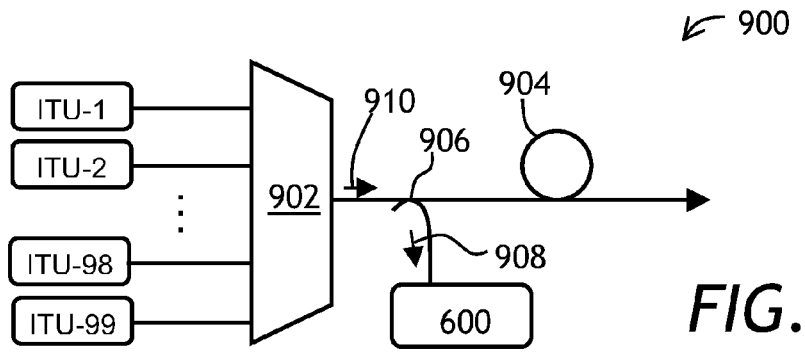
FIG. 9 is a block diagram of a DWDM optical system, wherein a single apparatus of FIG. 6 can be used in place of an optical power meter and/or a wavelength locker for each DWDM channel.

Another capability of the apparatus 600 of FIG. 6 is a capability to measure or continuously monitor a center wavelength in any frequency channel. Referring to FIG. 8 with further reference to FIG. 6, the center frequency of the transmission spectrum 702 of the tunable filter stage 602 is tuned to the ITU frequency $F_{ITU}$ of a frequency channel being monitored. The peak frequency of the transmission spectrum 705 of the first optical branch 605 of the optical interleaver stage 604 is tuned to a frequency $f_0 = F_{ITU} - \Delta\phi/2$, wherein $\Delta\phi$ is the optical frequency spacing between different frequency channels. At the tuning as shown in FIG. 8, measuring optical signals $P_4$ and $P_5$ at the first and second output ports 210 and 610 of the first and second optical branches 605 and 606, respectively, allows one to determine a current center frequency offset $f_C$ of the selected frequency channel from a ratio of the sixth and seventh optical signals $P_6$ and $P_7$:

$$f_C = c\frac{P_7}{P_6} \qquad (10)$$

wherein c is a predetermined constant. In cases where center frequency $F_S$ of the selected frequency channel is known from a previous measurement, the center frequency of the transmission spectrum 702 of the tunable filter stage 602 can be tuned to the center frequency $F_S$ instead of $F_{ITU}$, and the peak frequency of the transmission spectrum 705 of the first optical branch 605 of the optical interleaver stage 604 can be tuned to a frequency $f_0 = F_S - \Delta f/2$, The apparatus 600 of FIG. 6 can be advantageously used in an optical network. Referring now to FIG. 9, a dense wavelength-division multiplexing (DWDM) optical system 900 includes individual transmitters ITU-1 . . . ITU-99 coupled to a DWDM multiplexor 902 having an output fiber 904. An optical tap 906 is employed to tap out a small portion 908 of an optical signal 910. The portion 908 of the optical signal is coupled to the apparatus 600, which is configured to monitor the current optical power $P_C$ and the center frequency $F_S$ of each frequency channel, as explained above with reference to FIGS. 6 to 8. Thus, a wavelength locker may no longer be required for each of the individual transmitters ITU-1 . . . ITU-99. Due to a large number of the individual transmitters ITU-1 . . . ITU-99, this represents significant cost savings. The combined capability of the apparatus 600 to characterize all frequency channels, and in addition to continuously monitor current optical power $P_C$ and the center frequency $F_S$ in any frequency channel, is highly advantageous.

Figure 10:
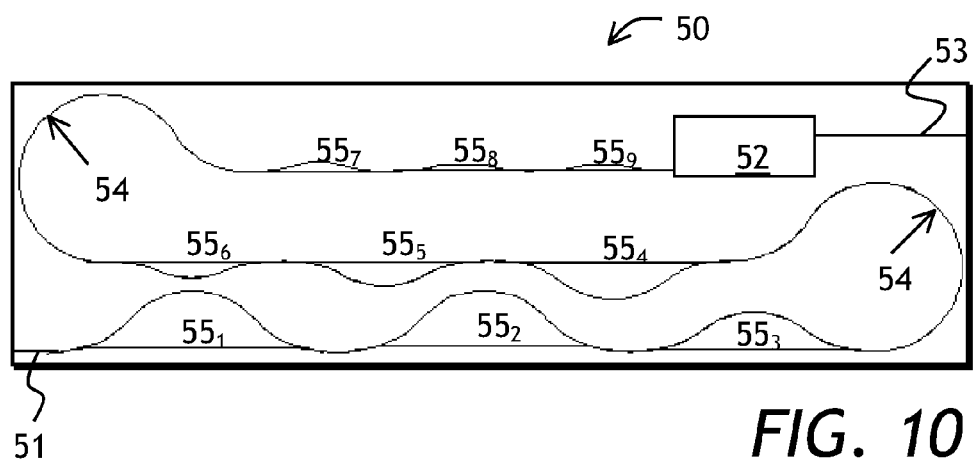
FIG. 10 is a plan view of a planar lightwave circuit (PLC) implementation of the tunable filter of FIG. 2.

Turning now to FIG. 10, a planar lightwave circuit (PLC) embodiment 50 of the tunable filter 202 is shown. The tunable optical filter 50 includes PLC waveguides, i.e. a core surrounded by cladding, on a substrate. The filter 50 includes an input port 51, an output port 53, and nine sequentially coupled unbalanced MZ interferometers $55_1$ to $55_9$. Each stage has a free spectral range (FSR) selected from a group of values satisfying the equation $$FSR_m = (2^{m-1}) * \Delta f \qquad (11)$$

wherein m is a positive integer and $\Delta f$ is the channel frequency spacing. In the filter 50, first and second stages $55_1$ and $55_2$ each have an FSR of 100 GHz, third and fourth stages $55_3$ and $55_4$ each have an FSR of 200 GHz, a fifth stage $55_5$ has an FSR of 400 GHz, a sixth stage $55_6$ has an FSR of 800 GHz, a seventh stage has an FSR of 1600 GHz, and eighth and ninth stages $55_8$ and $55_9$ each have an FSR of 3200 GHz. A section of the sequentially coupled stages $55_1$, $55_2$, and $55_3$; a section of the sequentially coupled stages $55_4$, $55_5$, and $55_6$; and a section of the sequentially coupled stages $55_7$, $55_8$, and $55_9$ are coupled to each other with waveguide loopback sections 54 as shown.

An optical shutter or variable optical attenuator (VOA) 52 is provided at the output end of the optical filter 50 for diverting all or a portion of the output signal away from the output port 53. An optical interleaver can be used in place of the VOA 52, in which case two output ports 53 will be provided. The optical filter 50 with an interleaver in place of the VOA 52 is an embodiment of the tunable filter stage 602 and the interleaver stage 604 in the apparatus 600 of FIG. 6.

The passbands and stopbands of each stage $55_1$ to $55_9$ are tuned by tuning relative optical length of at least one arm in each of the stages using any known technique, for example a localized heater. Preferably, the tuning range of such a heater or heaters is at least two and a half wavelengths, or $5\pi$ in optical phase units.

Figure 11:
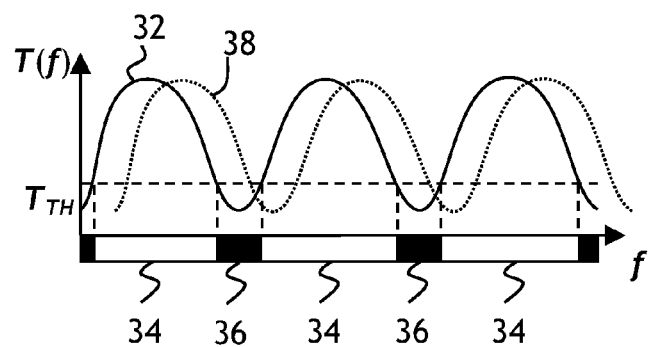
FIGS. 11 and 12 are transmission spectra of the unbalanced MZ interferometers of the PLC tunable filter of FIG. 10, explicitly showing passbands and stopbands of the unbalanced MZ interferometers.
Figure 12:
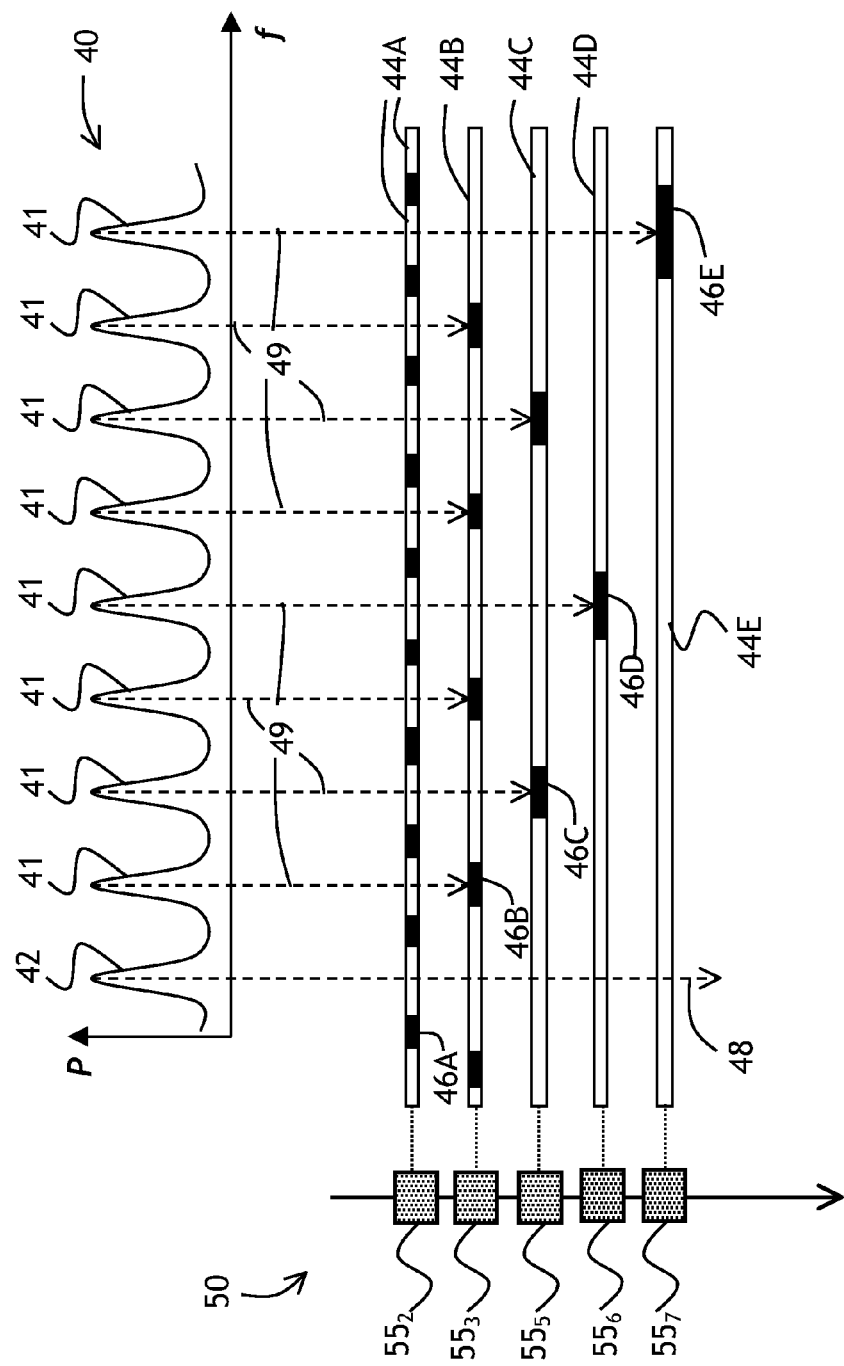

The relative position of passbands and stopbands of the MZ stages $55_1$ to $55_9$ of the filter 50 will now be considered in detail. Referring to FIG. 11, a transmission spectrum 32 of any MZ stage of the MZ stages $55_1$ to $55_9$ has a set of passbands 34 and stopbands 36 above and below, respectively, of a threshold level $T_{TH}$. When the MZ stage is tuned, the passbands 34 and the stopbands 36 are tuned simultaneously. Referring now to FIG. 12 with further reference to FIG. 11, a diagram illustrating the principle of wavelength selectivity of the tunable optical filter 50 is shown. A spectral shape of a typical optical signal 40 in an optical communications network includes a plurality of frequency channels 41 and 42. When one frequency channel 42 is to be selected, the rest of the frequency channels 41 are suppressed. Only some of fine-resolution MZ stages, $55_2$, $55_3$, $55_5$, $55_6$, and $55_7$, of the filter 50 are shown in FIG. 12, for clarity purposes. The MZ stages $55_2$, $55_3$, $55_5$, $55_6$, and $55_7$ have a plurality of equidistantly spaced conterminous frequency passbands 44A to 44E and frequency stopbands 46A to 46E, corresponding to the passbands 34 and stopbands 36 of FIG. 11. To achieve a high level of crosstalk suppression, the MZ stages $55_4$ to $55_8$ are tuned so as to have one passband 44A to 44E of each MZ stages $55_2$, $55_3$, $55_5$, $55_6$, and $55_7$ centered on the central frequency of the single frequency channel 42 being selected, while having at least one of the stopbands 46A to 46E of the MZ stages $55_2$, $55_3$, $55_5$, $55_6$, and $55_7$ centered on a central frequency of each remaining optical frequency channel 41 of the optical signal, so as to suppress each said remaining optical frequency channel 41 as shown with dashed arrows 49, while selecting the optical frequency channel 42 as shown with a leftmost dashed arrow 48.

The number of MZ stages $55_i$ in the PLC embodiment 50 of the tunable filter 202 of FIG. 2, and in the PLC embodiment 50 of the tunable filter stage 602 of the apparatus 600 of FIG. 6, is not limited to nine MZ stages $55_1$ to $55_9$. For example, the tunable filter stage 602 includes 14 MZ stages $55_i$. Increasing the number of MZ stages $55_i$ improves spectral resolution and out-of-band rejection, at an account of increased overall size and optical insertion loss.

Testing and Verification

Figure 13:
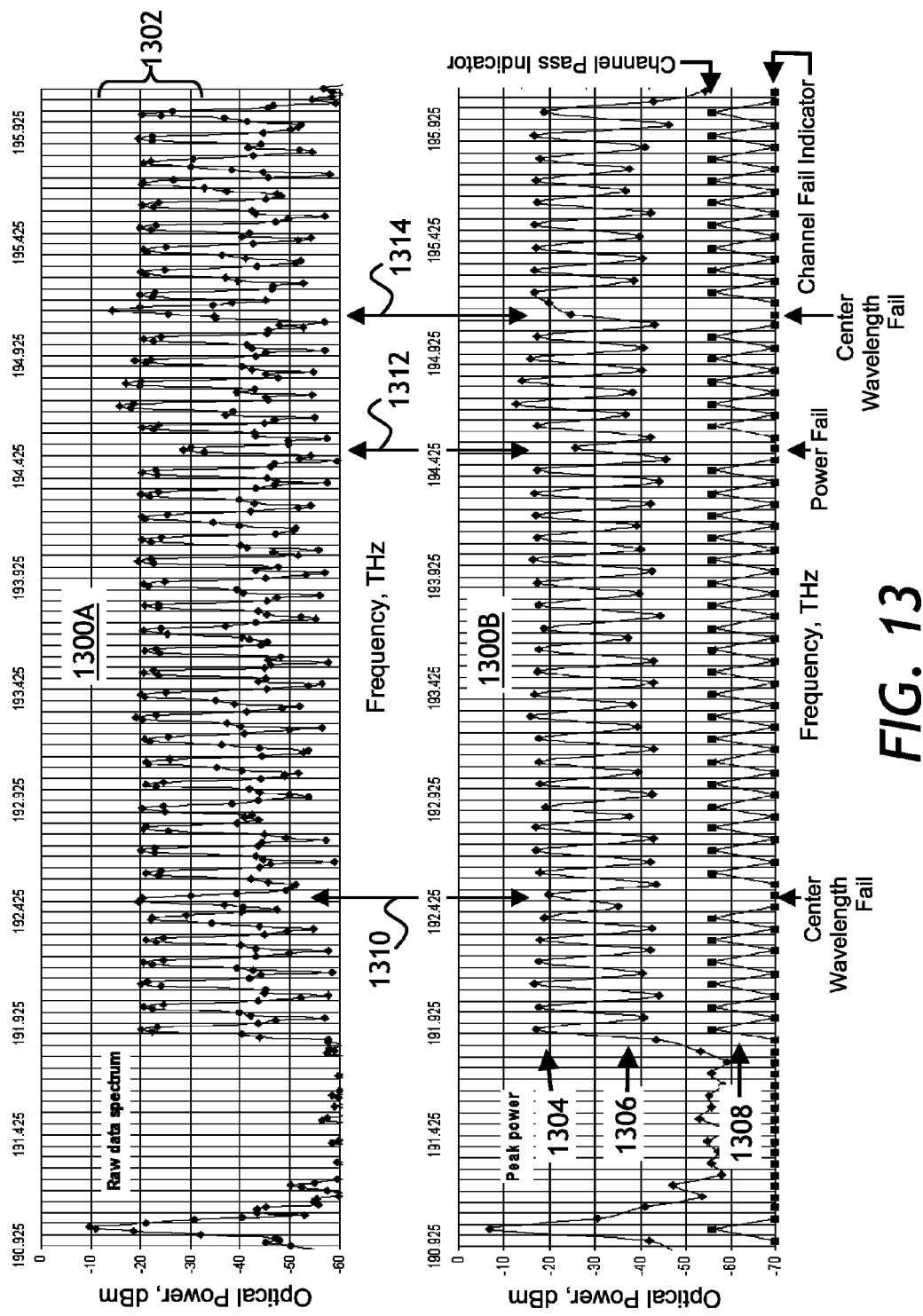
FIG. 13 is a spectral plot of measured DWDM optical signals, in which individual frequency channels have been characterized using the apparatus of FIG. 2 and the method of FIG. 3.

Turning now to FIG. 13 with further reference to FIGS. 2 and 3, a raw data spectral plot 1300A of a 100 GHz DWDM optical signal was obtained using the apparatus 200 of FIG. 2 employing the method 300 of FIG. 3. The three-point measurements performed according to steps 304 to 308 of the method 300 are displayed within an optical power range denoted by a bracket 1302. A processed data spectral plot 1300B shows frequency channel power levels 1304, frequency channel noise levels 1306, and a channel pass-fail indicator 1308 indicating channels that failed to meet minimal optical power or central wavelength specification. For instance, locations 1310 and 1314 show channels that has failed a center wavelength specification (ITU frequency+− 17.5 GHz), and a location 1312 shows a channel that has failed an optical power specification (>−20 dBm).

Figure 14:
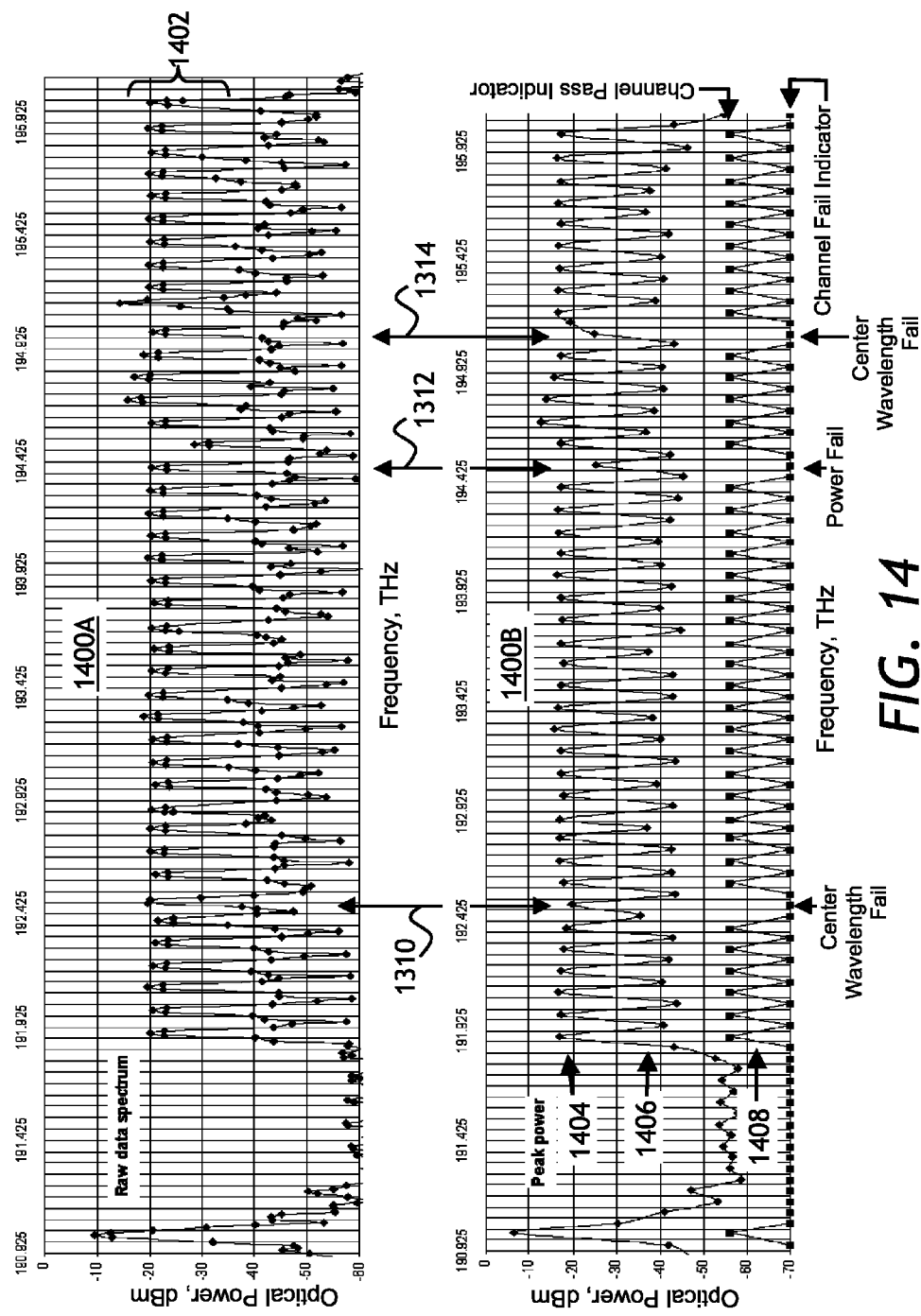
FIG. 14 is a spectral plot of the measured DWDM optical signals, in which individual frequency channels have been characterized using the apparatus of FIG. 2 and the method of FIG. 5.

Referring now to FIG. 14 with further reference to FIGS. 2 and 5, a raw data spectral plot 1400A of a 100 GHz DWDM optical signal was obtained using the apparatus 200 of FIG. 2 employing the method 500 of FIG. 5, wherein the center frequency $F_S$ of a frequency channel is determined in the step 310, and then the 3-point measurement represented by the steps 304, 306, and 308 is repeated at the measurement frequencies $F_1$, $F_2$, and $F_3$ disposed symmetrically with respect to $F_S$. In other words, the first, second, and third frequency offsets satisfy the condition $f_1=0$, and $f_2=-f_3\neq 0$. The symmetrical three-point measurements performed according to the method 500 are displayed within an optical power range denoted by a bracket 1402. A processed data spectral plot 1400B shows frequency channel power levels 1404, frequency channel noise levels 1406, and a channel pass-fail indicator 1408 indicating channels that failed to meet minimal optical power or central wavelength specification. Using symmetrical three-point measurements at $f_1=0$, and $f_2=-f_3\neq 0$ allows one to improve accuracy and fidelity of measurements of the channel power $P_S$ and the center frequency $F_S$.

Figure 15:
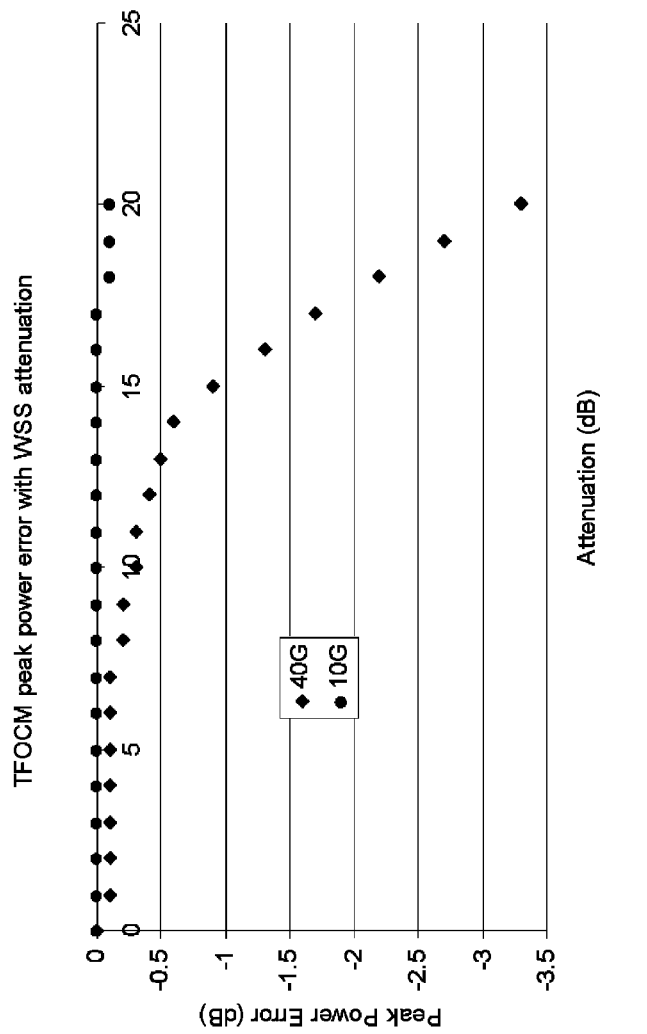
FIG. 15 is an attenuation plot of an experimentally evaluated channel power measurement error as a function of attenuation of the frequency channel being measured, in 40 GHz and 10 GHz modulated optical frequency channels at 50 GHz frequency spacing.

Referring to FIG. 15 with further reference to FIGS. 2 and 5, a channel power measurement error has been evaluated by measuring a peak power of the selected frequency channel using a spectrum analyzer and then evaluating the selected frequency channel power $P_S$ by performing a three-point measurement using the apparatus 200 of FIG. 2 and the method 500 of FIG. 5, and calculating the selected frequency channel power $P_S$ using Equation (6) above. The selected frequency channel was attenuated, while the neighboring frequency channels, spaced from the selected frequency channel by 50 GHz, were not attenuated; and the "peak power error", calculated as a difference between the spectrum analyzer peak power measurement and the value of the frequency channel power $P_S$, was plotted as a function of the attenuation magnitude in dB. The experiment was performed for both 10 GHz and 40 GHz modulated frequency channels. The spectral width $\sigma_S$ of the tunable filter 202 was 8.5 GHz (3 dB full width of 20 GHz). One can see that, for the 10 GHz spaced frequency channels, the measurement error is negligible to the attenuation levels of 20 dB. For the 40 GHz modulated frequency channels, the measurement error rapidly increases after the attenuation of approximately 14 dB.

Turning to FIGS. 16A and 16B with further reference to FIGS. 6 and 7, transmission spectra 1601 and 1602 in the first and second optical branches 605 and 606, respectively, of the interleaver stage 604 of the frequency channel characterization apparatus 600 of FIG. 6, are plotted together with a weighted (1604A; FIG. 16A) and unweighted (1604B; FIG. 16B) sum of spectra 1601 and 1602. Specifically, the spectrum 1602 in the second optical branch 606 was added with a multiplication factor M of two to the spectrum 1601 in the second optical branch 605. One can see that the weighted sum 1604A has a flat-top peak. Therefore, by measuring optical signals at the first and second output ports 210 and 610 and taking a weighted sum of the measurements, one can monitor the current optical power $P_C$ in real time. The multiplication factor M=b/a, wherein a and b are the predetermined coefficients of Equation (9) above.

Figure 17:
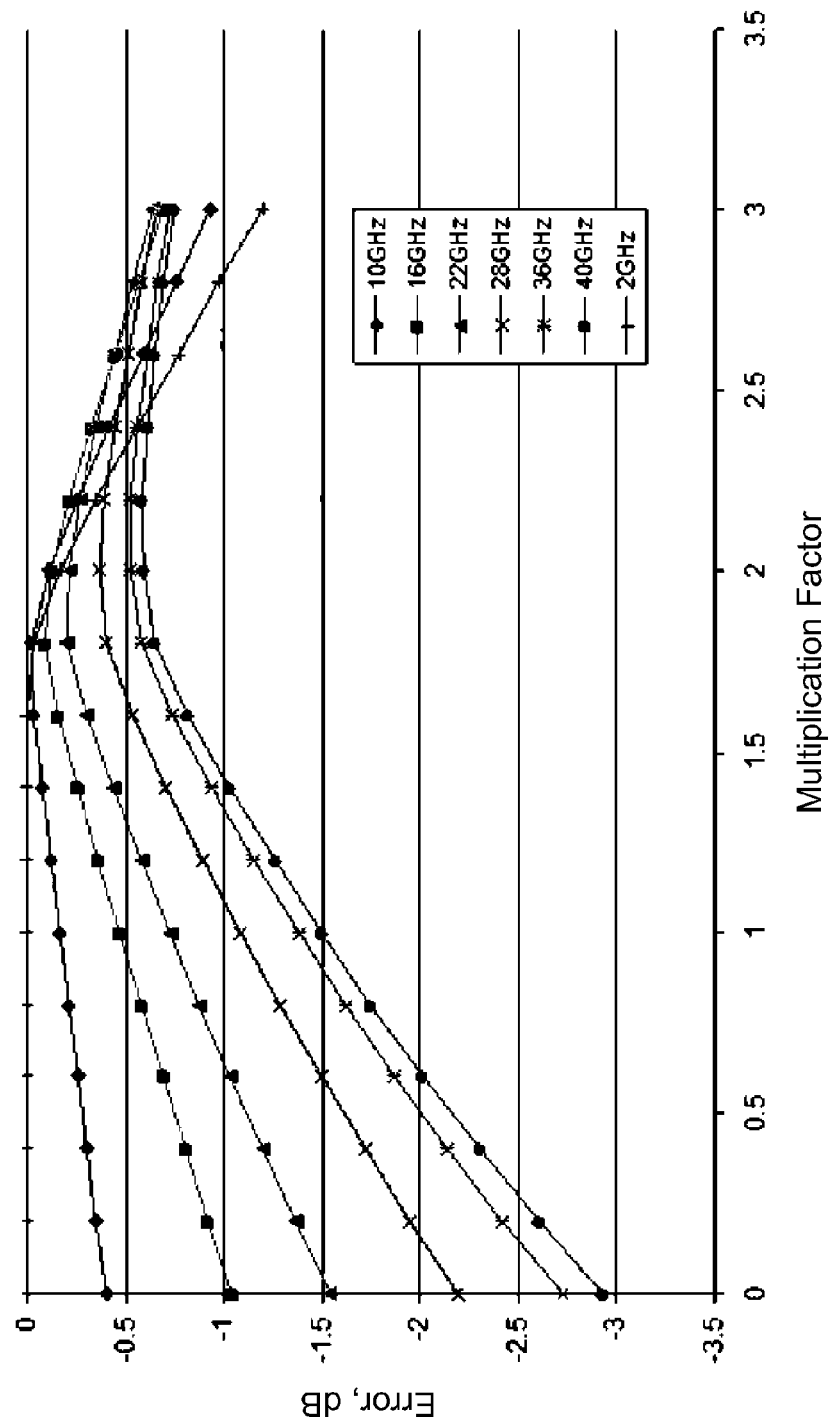
FIG. 17 is a diagram of power estimation error using weighted sum of the two interleaver outputs as a function of a multiplication factor of the weighted sum.

An optimal multiplication factor M can be selected empirically or from a simulation. Referring to FIG. 17 with further reference to FIG. 6, calculated measurement error is plotted as a function of the multiplication factor M for Gaussian spectra of widths varying from 2 GHz to 10 FGHz. The first and second branches of the interleaver stage 604, used in this calculation, had a free spectral range of 50 GHz and a cosine-square spectral shape. One can see that the optimal multiplication factor M is between 1.5 and 2.2.

Figure 18:
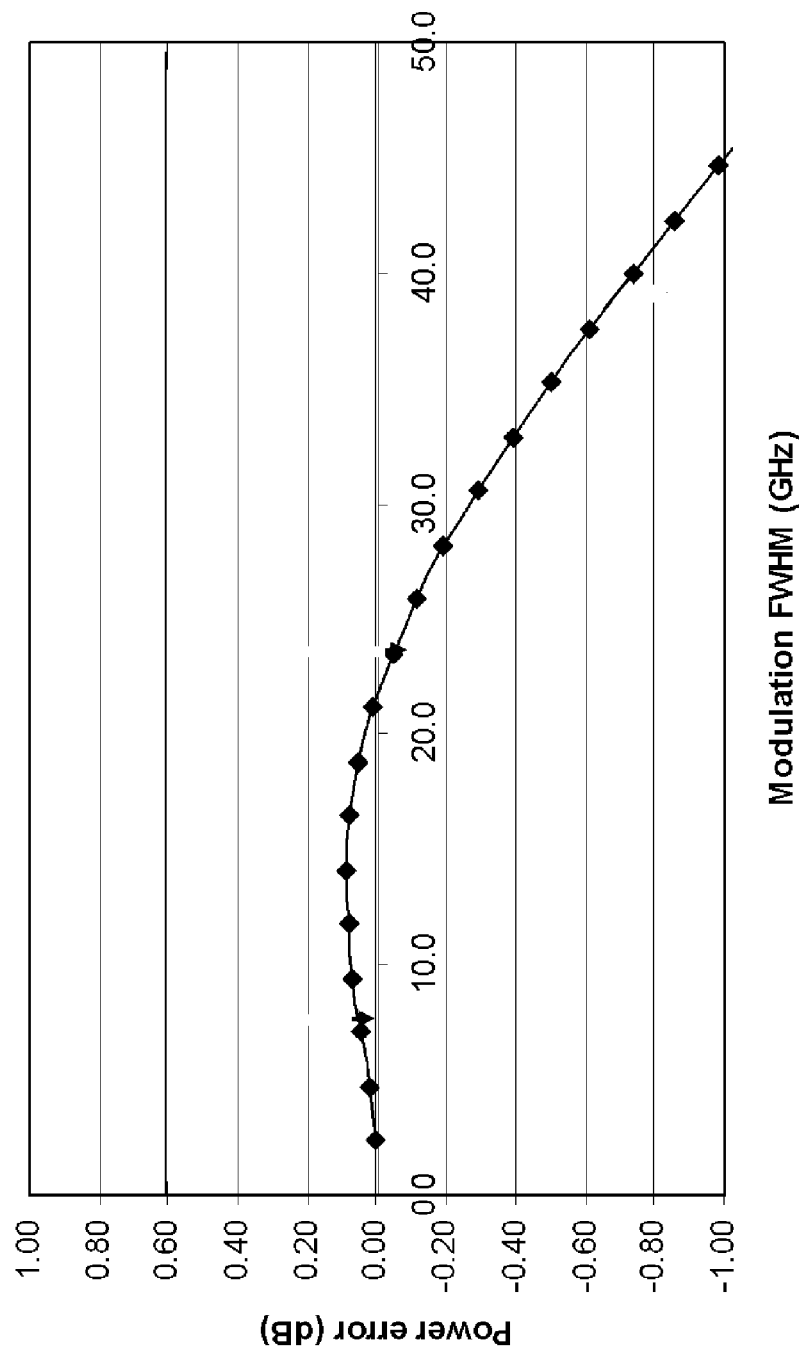
FIG. 18 is a plot of power measurement error as a function of modulation bandwidth.

Turning to FIG. 18, a calculated power error in dB is plotted as a function of the modulation width in GHz at the multiplication factor M of 2.0. One can see that the power error is below 0.25 dB at modulation widths of up to 30 GHz, and below 0.8 dB at the modulation width of 40 GHz.

Figure 19:
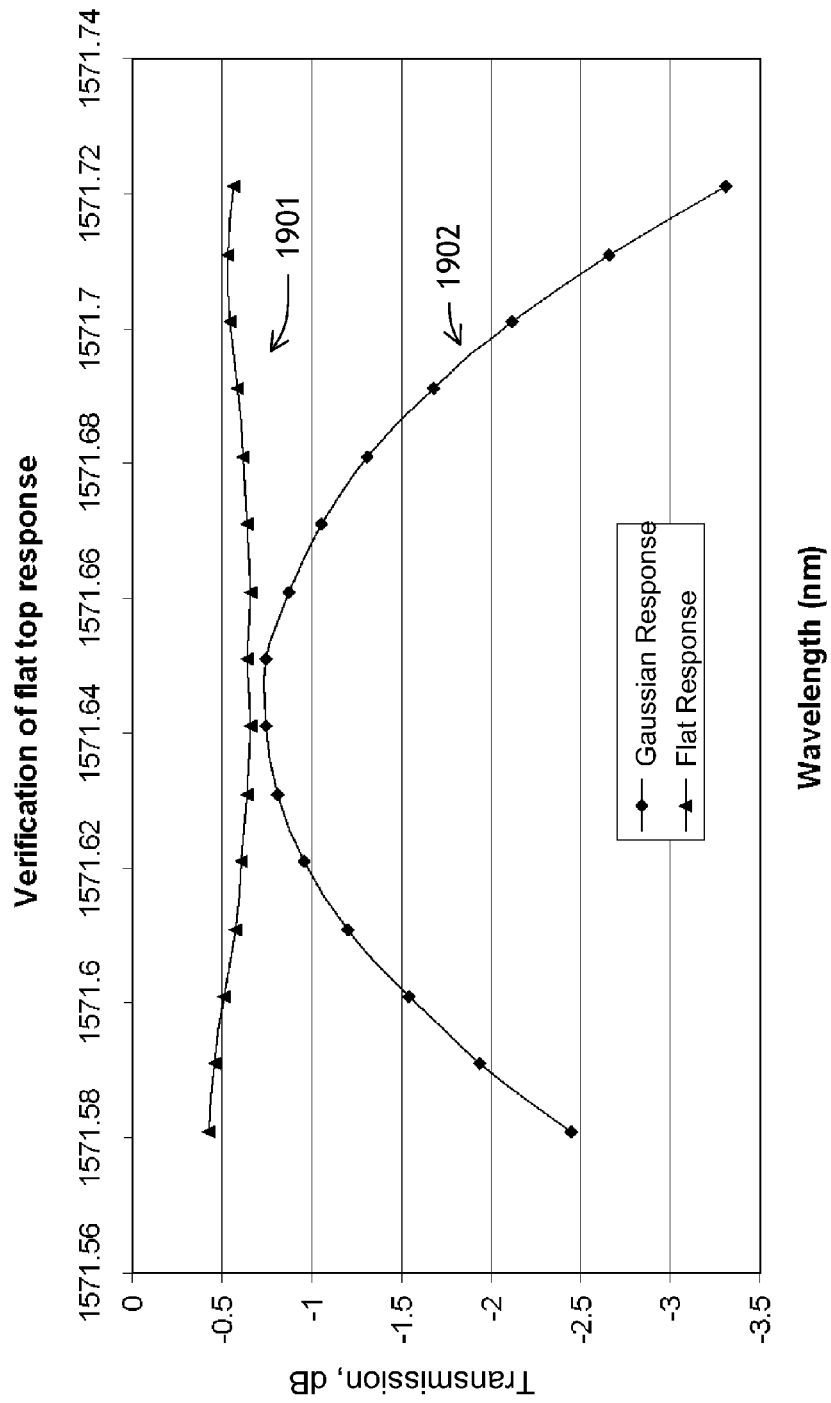
FIG. 19 is a comparison spectral plot of power measurement error using a Gaussian filter and a weighted-sum filter.

Referring now to FIG. 19, a power measurement error in dB is plotted at 1901 as a function of wavelength detuning for the interleaver stage 604 having the free spectral range of 50 GHz. The multiplication factor M of 2.0 was used in this measurement. One can see that the power measurement error due to wavelength detuning of +−700 pm stays within +−0.2 dB. A power measurement error 1902 for a Gaussian tunable filter, the spectral shape of which is represented by the transmission spectrum 1601 of FIG. 16A of the first optical branch 605 of the interleaver stage 604 of FIG. 6 is also plotted for comparison.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for characterizing a selected one of a plurality of frequency channels of an optical signal in an optical network, the method comprising:
   (a) coupling the optical signal to an input port of a tunable optical filter, and coupling a controller to a first output port of the tunable optical filter, for detecting an optical signal filtered by the tunable optical filter, wherein a spectral bandwidth of the tunable optical filter $\sigma_{TF}$ is smaller than one half of a channel spacing $\Delta f$ of the optical network;
   (b) upon completion of step (a), using the controller to tune a center frequency of the tunable optical filter to first, second, and third measurement frequencies proximate a center frequency Fs of the selected frequency channel, and to measure first, second, and third optical signals $P_1$, $P_2$, and $P_3$ at the first output port at the first, second, and third measurement frequencies, respectively, wherein the first, second, and third optical signals $P_1$, $P_2$, and $P_3$ originate from the selected frequency channel;
   (c) using the controller to determine the center frequency Fs of the selected frequency channel from the first, second, and third optical signals $P_1$, $P_2$, and $P_3$ measured in step (b), and to determine first and second frequency offsets $f_1$ and $f_2$ between the first and second measurement frequencies, respectively, and the center frequency Fs; and
   (d) upon completion of step (c), using the controller to determine a total optical power Ps and a spectral width $\sigma_s$ of the selected frequency channel from the first and second measured optical signals $P_1$, and $P_2$, and the first and second frequency offsets $f_1$ and $f_2$.

2. The method of claim 1, wherein in step (d), the total optical power $P_S$ and the spectral width $\sigma_s$ of the selected frequency channel are determined using the following equations:

$$P_S = \frac{\sigma_{OCM} P_1}{\sigma_{TF}} \cdot \exp\left[\frac{f_1^2}{2\sigma_{OCM}^2}\right]; \text{ and } \sigma_s = \sqrt{\sigma_{OCM}^2 - \sigma_{TF}^2};$$

$$\text{wherein } \sigma_{OCM} = \sqrt{\frac{f_2^2 - f_1^2}{2\ln\left(\frac{P_1}{P_2}\right)}}.$$

3. The method of claim 1, wherein step (c) further includes determining a third frequency offset $f_3$ between the third measurement frequency and the center frequency $F_S$, and wherein step (d) further includes determining the total optical power $P_S$ and the spectral width $\sigma_S$ of the selected frequency channel from the first, second, and third optical signals $P_1(f_1)$, $P_2(f_2)$, and $P_3(f_3)$.

4. The method of claim 1, wherein in step (c), the center frequency $F_S$ of the selected frequency channel is determined by computing an average of the first, second, and third measurement frequencies weighted by the measured optical signals $P_1$, $P_2$, and $P_3$, respectively, or by a Gaussian curve fitting of the first, second, and third optical signals $P_1(f_1)$, $P_2(f_2)$, and $P_3(f_3)$.

5. The method of claim 4, further comprising
   (e) upon completion steps (b) and (c), repeating step (b) at different values of the first, second, and third frequency offsets $f_1$, $f_2$, and $f_3$, so that $f_1=0$, and $f_2=f_3\neq 0$, and
   (f) upon completing step (e), determining the total optical power $P_S$ and the spectral width $\sigma_S$ of the selected frequency channel from the repeated measurement of the first, second, and third optical signals $P_1(f_1)$, $P_2(f_2)$, and $P_3(f_3)$.

6. The method of claim 1, wherein in step (a), the tunable optical filter includes a tunable filter stage and an optical interleaver stage serially coupled to each other, and a second output port, wherein the tunable filter stage is coupled to the input port, and wherein the optical interleaver stage has first and second optical branches coupled to the first and second output ports, respectively, the method further comprising
   (1) tuning a center frequency of the tunable filter stage to the center frequency Fs of the selected frequency channel;
   (2) tuning a peak transmission frequency of the first optical branch of the optical interleaver stage to the center frequency Fs;
   (3) upon completion of steps (1) and (2), monitoring fourth and fifth optical signals $P_4$ and $P_5$ at the first and second output ports, respectively, and determining a current optical power Pc of the selected frequency channel from a weighted sum and of the monitored fourth and fifth optical signals $P_4$ and $P_5$.

7. The method of claim 1, wherein in step (a), the tunable optical filter includes a tunable filter stage and an optical interleaver stage serially coupled to each other, and a second output port, wherein the tunable filter stage is coupled to the input port, and wherein the optical interleaver stage has first and second optical branches coupled to the first and second output ports, respectively, the method further comprising
   (i) tuning a center frequency of the tunable filter stage to the center frequency Fs of the selected frequency channel;
   (ii) tuning a peak transmission frequency of the first optical branch of the optical interleaver stage to a frequency $f_0=Fs-\Delta f/2$;
   (iii) upon completion of steps (i) and (ii), monitoring sixth and seventh optical signals $P_6$ and $P_7$ at the first and second output ports, respectively, and determining a current center frequency offset fc of the selected frequency channel from a ratio and of the sixth and seventh optical signals $P_6$ and $P_7$.

8. A method for characterizing a selected one of a plurality of frequency channels of an optical signal in an optical network, the method comprising:
   (a) coupling the optical signal to an input port of a tunable optical filter having first and second output ports for outputting filtered optical signals, wherein the tunable optical filter comprises a tunable filter stage and an optical interleaver stage serially coupled to each other, wherein the tunable filter stage is coupled to the input port, and wherein the optical interleaver stage has first and second optical branches coupled to the first and second output ports, respectively, wherein a spectral bandwidth of the tunable optical filter between the input port and the first output port; and between the input port and the second output port is smaller than one half of a channel spacing $\Delta f$ of the frequency channels of the optical network;
   (b) using a controller coupled to the tunable optical filter to tune a center frequency of the tunable filter stage to an ITU frequency $f_{ITU}$ of the selected frequency channel;
   (c) using the controller to tune a peak transmission frequency of the first optical branch of the optical interleaver stage to the ITU frequency $f_{ITU}$;
   (d) upon completion of steps (b) and (c), using the controller to measure first and second optical signals at the first and second output ports, respectively; and
   (e) upon completion of step (d), using the controller to determine an optical power of the selected frequency channel from a weighted sum and of the first and second optical signals measured in step (d).

9. The method of claim 8, further comprising
   (f) tuning the center frequency of the tunable filter stage to the ITU frequency $f_{ITU}$;
   (g) tuning the peak transmission frequency of the first optical branch of the optical interleaver stage to $f_0=f_{ITU}-\Delta f/2$;
   (h) upon completion of steps (f) and (g), measuring third and fourth optical signals at the first and second output ports, respectively; and
   (i) upon completion of step (h), determining a center frequency of the selected frequency channel from a ratio and of the third and fourth optical signals measured in step (h).

10. An apparatus for characterizing a selected one of a plurality of frequency channels of an optical signal in an optical network, the apparatus comprising:
    a tunable optical filter having an input port for inputting the optical signal, and a first output port for outputting a filtered optical signal, wherein a spectral bandwidth of the tunable optical filter $\sigma_{TF}$ is smaller than one half of a channel spacing $\Delta f$ of the optical network;
    a controller coupled to the tunable optical filter for tuning a central frequency thereof, and to the first output port for detecting light exiting therefrom;
    wherein the controller is configured to tune a center frequency of the tunable optical filter to first, second, and third measurement frequencies proximate a center frequency $F_S$ of the selected frequency channel, and to measure first, second, and third optical signals $P_1$, $P_2$, and $P_3$ at the first output port at the first, second, and third measurement frequencies, respectively, wherein the first, second, and third optical signals $P_1$, $P_2$, and $P_3$ originate from the selected frequency channel; and
    wherein the controller is further configured to determine the center frequency $F_S$ of the selected frequency channel from the measured first, second, and third optical signals $P_1$, $P_2$, and $P_3$, and determine first and second frequency offsets $f_1$ and $f_2$ between the first and second measurement frequencies, respectively, and the center frequency $F_S$; and to determine a total optical power $P_S$ and a spectral width $\sigma_S$ of the selected frequency channel from the first and second optical signals $P_1(f_1)$ and $P_2(f_2)$.

11. The apparatus of claim 10, wherein the total optical power $P_S$ and the spectral width $\sigma_S$ of the selected frequency channel are determined using the following equations:

$$P_S = \frac{\sigma_{OCM} P_1}{\sigma_{TF}} \cdot \exp\left[\frac{f_1^2}{2\sigma_{OCM}^2}\right]; \text{ and } \sigma_s = \sqrt{\sigma_{OCM}^2 - \sigma_{TF}^2};$$

$$\text{wherein } \sigma_{OCM} = \sqrt{\frac{f_2^2 - f_1^2}{2\ln\left(\frac{P_1}{P_2}\right)}}.$$

12. The apparatus of claim 10, wherein the controller is further configured to determine a third frequency offset $f_3$ between the third measurement frequency and the center frequency $F_S$, and to determine the total optical power $P_S$ and the spectral width $\sigma_S$ of the selected frequency channel from the first, second, and third optical signals $P_1(f_1)$, $P_2(f_2)$, and $P_3(f_3)$.

13. The apparatus of claim 10, wherein the controller is configured to determine the center frequency $F_S$ of the selected frequency channel by computing a mean average of $f_1$, $f_2$, and $f_3$, weighted by the measured optical signals $P_1$, $P_2$, and $P_3$, respectively, or by Gaussian curve fitting of the first, second, and third optical signals $P_1(f_1)$, $P_2(f_2)$, and $P_3(f_3)$.

14. The apparatus of claim 10, wherein the controller is further programmed to repeat, after determining the center frequency $F_S$, the measurement of the first, second, and third optical signals $P_1$, $P_2$, and $P_3$ at different values of the first, second, and third frequency offsets $f_1$, $f_2$, and $f_3$, so that $f_1=0$, and $f_2=f_3\neq 0$, wherein the controller is further programmed to determine the total optical power $P_S$ and the spectral width $\sigma_S$ of the selected frequency channel from the repeated measurement of the first, second, and third optical signals $P_1(f_1)$, $P_2(f_2)$, and $P_3(f_3)$.

15. The apparatus of claim 10, wherein the tunable optical filter comprises a tunable filter stage and an optical interleaver stage serially coupled to each other, and a second output port, wherein the tunable filter stage is coupled to the input port, and wherein the optical interleaver stage has first and second optical branches coupled to the first and second output ports, respectively,
wherein the controller is coupled to the second output port for detecting light exiting the second output port.

16. The apparatus of claim 15, wherein the controller is configured to: tune a center frequency of the tunable filter stage to the center frequency $F_S$ of the selected frequency channel; tune a peak transmission frequency of the first optical branch of the optical interleaver stage to the center frequency $F_S$; and, upon completion of the tuning, to monitor fourth and fifth optical signals $P_4$ and $P_5$ at the first and second output ports, respectively, and to determine a current optical power $P_C$ of the selected frequency channel from a weighted sum and of the monitored fourth and fifth optical signals $P_4$ and $P_5$.

17. The apparatus of claim 15, wherein the controller is configured to: tune a center frequency of the tunable filter stage to the center frequency $F_S$ of the selected frequency channel; tune a peak transmission frequency of the first optical branch of the optical interleaver stage to a frequency $f_0=F_S-\Delta f/2$; and, upon completion of the tuning, to monitor sixth and seventh optical signals $P_6$ and $P_7$ at the first and second output ports, respectively, and to determine a current center frequency offset $f_C$ of the selected frequency channel from a ratio and of the sixth and seventh optical signals $P_6$ and $P_7$.

18. The apparatus of claim 15, wherein the tunable filter stage of the tunable optical filter comprises a plurality of sequentially coupled Mach-Zehnder interferometers each having a plurality of equidistantly spaced conterminous frequency passbands and frequency stopbands, tunable by the controller,
wherein the Mach-Zehnder interferometers are tunable so as to have one passband of each Mach-Zehnder interferometer centered on the central frequency of the tunable optical filter, and to have at least one of the stopbands of the Mach-Zehnder interferometers centered on an ITU frequency of each of the plurality of frequency channels, other than the selected frequency channel.

19. The apparatus of claim 18, wherein the tunable optical filter comprises a planar lightwave circuit, wherein the Mach-Zehnder interferometers of the tunable filter stage and the optical interleaver stage are a part of the planar lightwave circuit.

20. An apparatus for characterizing a selected one of a plurality of frequency channels of an optical signal in an optical network, the apparatus comprising:
a tunable optical filter having an input port for inputting the optical signal and first and second output ports for outputting filtered optical signals, wherein the tunable optical filter comprises a tunable filter stage and an optical interleaver stage serially coupled to each other, wherein the tunable filter stage is coupled to the input port, and wherein the optical interleaver stage has first and second optical branches coupled to the first and second output ports, respectively, wherein a spectral bandwidth of the tunable optical filter between the input port and the first output port; and between the input port and the second output port is smaller than one half of a channel spacing $\Delta f$ of the frequency channels of the optical network;
a controller coupled to the tunable optical filter for tuning a central frequency thereof, and coupled to the first and second output ports for detecting light exiting therefrom;
wherein the controller is configured to tune a center frequency of the tunable filter stage to an ITU frequency $f_{ITU}$ of the selected frequency channel; to tune a peak transmission frequency of the first optical branch of the optical interleaver stage to the ITU frequency $f_{ITU}$; and, upon completion of the tuning, to measure first and second optical signals at the first and second output ports, respectively, and to determine an optical power of the selected frequency channel from a weighted sum of the first and second optical signals.

21. The apparatus of claim 20, wherein the controller is further configured to tune the center frequency of the tunable filter stage to the ITU frequency $f_{ITU}$; to tune the peak transmission frequency of the first optical branch of the optical interleaver stage to $f_0=f_{ITU}-\Delta f/2$, and, upon completion of the tuning, to measure third and fourth optical signals at the first and second output ports, respectively, and to determine a center frequency of the selected frequency channel from a ratio of the third and fourth optical signals.

* * * * *